Dec. 29, 1936.    J. R. THORP ET AL    2,065,837
BRAKE EXTENSION LEVER
Filed May 31, 1935
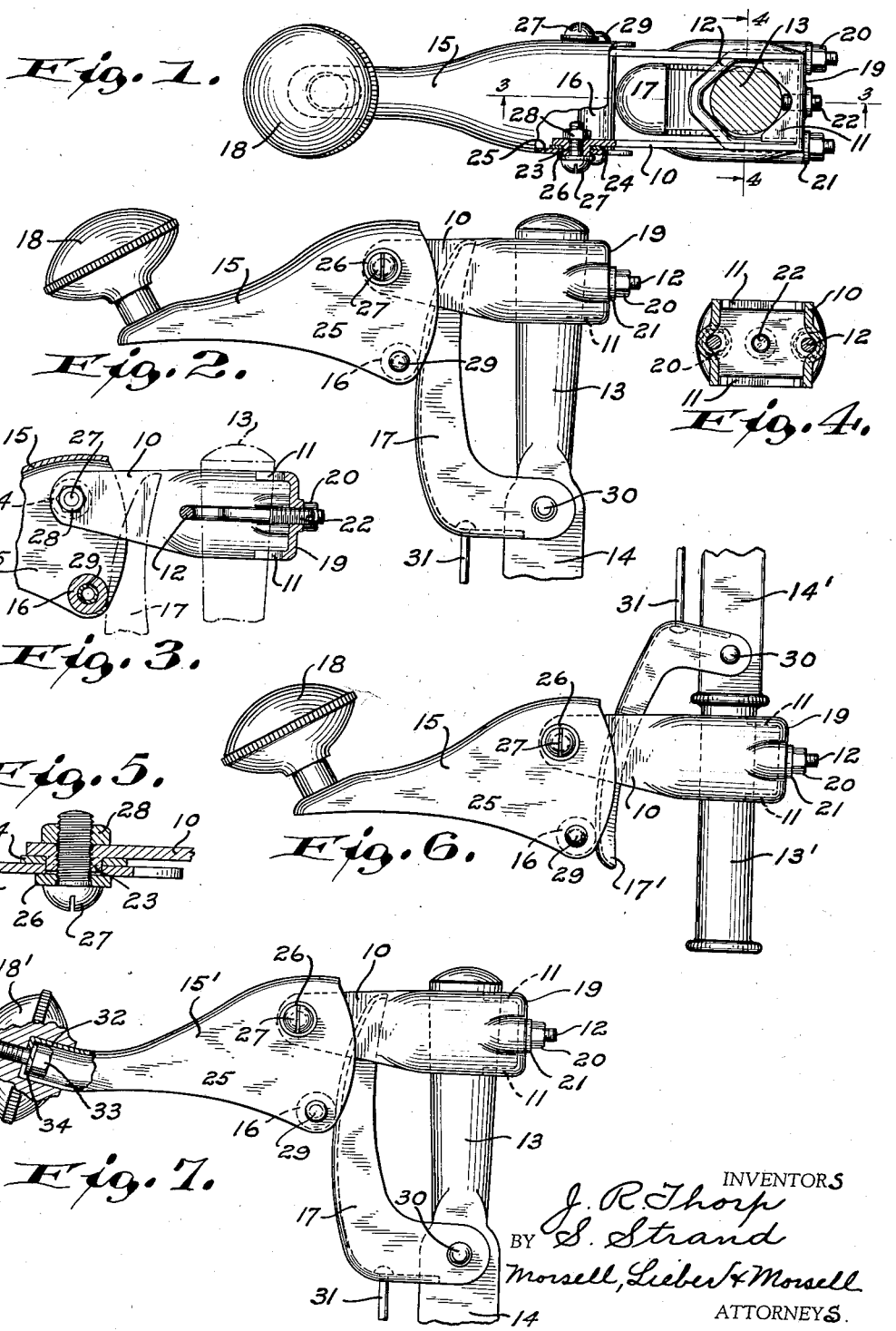
INVENTORS
J. R. Thorp
BY S. Strand
Morsell, Lieber & Morsell
ATTORNEYS Patented Dec. 29, 1936

2,065,837

UNITED STATES PATENT OFFICE 2,065,837

BRAKE EXTENSION LEVER

Joel R. Thorp and Steen Strand, West Allis, Wis., assignors to The Fulton Company, West Allis, Wis., a corporation of Wisconsin Application May 31, 1935, Serial No. 24,347

8 Claims. (Cl. 74—479)

The present invention relates to improvements in the construction and operation of extension levers for facilitating actuation of relatively inaccessible brake levers or the like, associated with various types of motor vehicles.

An object of the invention is to provide an improved attachment for facilitating actuation of relatively inaccessible levers such as the emergency brake levers of automobiles, which attachment is simple and durable in construction as well as highly effective in use.

Present day automobiles and motor trucks, are provided with several types of emergency brake actuating levers which are supposed to be conveniently accessible from the driver's seat, but most of which are in fact relatively inaccessible especially to an individual having a relatively short reach. The gripping handles of these emergency levers are ordinarily located beneath the dash at either side and forwardly of the steering wheel, and in a vehicle having an adjustable driver's seat which has been moved rearwardly as far as possible, it becomes practically impossible for a short armed individual to reach and quickly grasp the emergency lever handle.

One type of emergency brake actuating lever now in common use, is provided with an upper gripping handle and with a push button release at the uppermost extremity of the handle, and in order to facilitate actuation of this push button type of lever, it has heretofore been proposed to provide an extension attachment of the kind forming the subject of J. R. Thorp application Serial No. 690,821, filed September 25, 1933, wherein an extension lever is pivotally attached to the forward end of a bracket secured to the upper portion of the emergency brake actuating handle, and extends rearwardly over the top of the push button of the releasing mechanism, the rear end of the extension lever being provided with a gripping knob for facilitating manipulation thereof. This kind of extension lever has proven very satisfactory for actuating the push-button type of emergency brake lever.

Another type of emergency brake actuating lever also in common use, has a gripping handle at the swinging end thereof, and is provided with a releasing handle or lever which is pivotally attached to the main lever between the handle and the pivotal support for the latter. This type of emergency lever is released by simultaneously gripping the releasing lever and the main lever handle, and by subsequently pressing the gripped elements toward each other. The prior brake extension lever which has proven satisfactory in connection with the push-button type of emergency lever, is not however adapted for use in conjunction with the lever released type of brake lever, and so far as known, no commercially satisfactory attachment has been devised for facilitating the actuation of the lever released type of emergency lever.

It is therefore a more specific object of the present invention to provide an improved brake extension lever, which is especially adapted for association with and for effective actuation of emergency brake actuating levers of the release lever type.

Another specific object of the invention is to provide an improved brake lever attachment which may be firmly secured to a lever released type of emergency brake lever, and which is effectively cooperable with this type of lever whether pivoted above or below the actuating handle thereof.

A further specific object of the invention is to provide an improved accessory for facilitating actuation of an emergency brake operating lever, which is conveniently manipulable, and which moreover presents a neat and highly attractive appearance.

Still another specific object of the invention is to provide a brake extension lever assemblage which can be readily applied to a brake lever, and which can be manufactured from sheet metal with the aid of punches and dies, and sold at moderate cost.

These and other specific objects and advantages will be apparent from the following detailed description.

A clear conception of several embodiments of the present invention, and of the mode of constructing and of utilizing brake extension attachments built in accordance therewith, may be had by referring to the drawing accompanying and forming a part of this specification wherein like reference characters designate the same or similar parts in the various views.

Fig. 1 is a part sectional top view of one form of the improved brake extension lever, showing the same applied to an ordinary lever released emergency brake lever swingable about a lower pivot;

Fig. 2 is a side elevation of the assemblage of Fig. 1, showing only the upper swingable end of the brake actuating lever;

Fig. 3 is a fragmentary central longitudinal vertical section through the brake extension lever of Fig. 1, taken along the line 3—3 and showing a fragment of the brake actuating lever in dot-and-dash lines;

Fig. 4 is a transverse vertical section through the extension lever assemblage of Fig. 1, taken along the line 4—4;

Fig. 5 is an enlarged fragmentary section taken through one of the pivots of the brake extension lever;

Fig. 6 is a side elevation of one of the brake extension levers of the type shown in Fig. 2, applied to an emergency brake actuating lever of the suspended or reversely pivoted type; and Fig. 7 is a side elevation of a modified form of the improved brake extension lever showing the same applied to a brake lever having a lower pivot.

While the improvement has been shown and described herein as being specifically embodied in extension devices especially applicable to the emergency brake actuating levers of vehicles or the like, it is not the intent to unnecessarily restrict the scope by such specific embodiment.

Referring to Figs. 1 to 5 inclusive of the drawing, the improved extension lever specifically illustrated therein comprises, a bracket 10 of U-shaped form having upper and lower clamping flanges 11; a substantially U-shaped element or clevis 12 for clamping the flanges 11 of the bracket 10 into snug engagement with the handle 13 of an emergency brake actuating lever 14; a lever member 15 pivotally attached to the rear end of the bracket 10 and having a transverse roller 16 cooperable with the brake releasing arm or latch 17 of the main brake lever 14; and a manipulating handle or knob 18 carried by the swinging end of the member 15.

The U-shaped bracket 10 may be formed of a single piece of sheet metal, and the clamping flanges 11 are preferably formed integral with the front end wall 19 and are disposed between the side walls or arms of the bracket 10, these flanges 11 having V-shaped recesses adapted for engagement with the circular brake lever handle 13 as clearly shown in Fig. 1. The U-shaped clevis 12 may be formed of rod stock with threaded ends, and is located mid-way between the upper and lower bracket flanges 11, as clearly disclosed in Figs. 3 and 4. The clevis 12 is adapted to be drawn into clamping engagement with the opposite side of the circular brake lever handle 13 by means of nuts 20 and lock washers 21 coacting therewith, as illustrated in Figs. 1 and 3, and the front wall 19 of the bracket 10 may be provided with a threaded opening adapted for the reception of a locking set screw 22, although this screw is not essential. The bracket 10 may thus be firmly attached to the brake lever handle 13 in any desired position and locked against possible displacement.

The lever member 15 may also be formed of sheet metal with the aid of punches and dies, and is swingably supported upon integral bosses 23 projecting outwardly from the rear ends of the side arms of the bracket 10, as shown in detail in Fig. 5. The bosses 23 which are punched directly from the sides of the bracket 10, are of sufficient length to accommodate fibre washers 24 disposed within the side walls 25 of the member 15, and these side walls 25 are swingable about the bosses 23 and are retained in position thereon by washers 26, screws 27 and nuts 28. The washers 26 clamp the side walls 25 so as to produce sufficient friction to retain the lever member in desired position and to prevent rattling, on the screws 27 have screw thread coaction with the interior of the bosses 23 so that the nuts 28 will function to lock these screws against displacement. The roller 16 which is cooperable with the releasing latch 17, is rotatably supported between the side walls 25 of the member 15, some distance from the common axis of the pivot bosses 23, by a tubular transverse pin 29 the opposite ends of which may be riveted, pressed or snapped into alined openings in the walls 25. This roller 16 should be of such length as to permit free rotation thereof as the member 15 is swung to cause the roller to travel along the release latch 17.

The brake releasing latch 17 of Figs. 2 and 7, is swingably supported upon the emergency control lever 14 by a pivot pin 30, and has the usual rod connection 31 for actuating the brake lever locking pawl. While the emergency lever 14 of Figs. 2 and 7, is supported from a pivot disposed beneath the handle 13, this lever may also be of the type shown in Fig. 6, wherein the emergency lever 14' has its handle 13' and releasing latch 17' swingable about a pivot disposed above these elements. The extension lever manipulating handle or knob 18 may be attached to the rear extremity of the lever member 15 in any suitable manner as with the aid of a screw, or by welding or riveting, or otherwise; and may be disposed vertically, or at an angle as shown in Figs. 2 and 6, or horizontally as shown in Fig. 7. When the knob 18' is disposed substantially horizontal as illustrated in Fig. 7 the sheet metal lever member 15' may have its rear end 32 formed tubular for snug insertion within a recess in the knob 18', and these elements may then be fastened together by a cap screw 33 and a lock washer 34 coacting with the parts as illustrated in Fig. 7. The remainder of the assemblage shown in Fig. 7, is identically the same as that of Fig. 2, and the modified lever of Fig. 7 is also adapted for application to a modified brake actuating lever such as shown in Fig. 6.

In applying the improved brake extension lever to an emergency brake actuating lever 14 of the type shown in Figs. 2 and 7, it is only necessary to release the clamping nuts 20 and the locking set screw 22 sufficiently to permit the bracket 10 to be slipped over the upper end of the emergency lever handle 13, whereupon the extension lever assembly may be firmly clamped into proper position by tightening the nuts 20 and by finally adjusting the set screw 22. The flanges 11 and the forward portion of the clevis 12 will then be locked in firm engagement with the handle 13, and the lever member 15 may subsequently be swung about its supporting bosses 23 to force the roller 16 against the emergency brake release latch 17. When the release latch 17 has been thus actuated, the knob 18 may be utilized to permit the emergency brake lever 14 to move forwardly, or to pull this lever rearwardly into braking position. When the knob 18 is released, the spring which normally coacts with the brake release latch 17, will cause this lever to again assume the position shown in Figs. 2 and 7 and will thereby restore the lever member 15 to the position illustrated. The mode of attaching the modified brake extension lever of Fig. 7 to an emergency lever 14, is precisely the same as in the case of Fig. 2, and the modified lever member 15' and actuating knob 18' will obviously function the same as in the case of Fig. 2.

In applying the improved brake extension lever to an inverted type of emergency brake lever 14' such as shown in Fig. 6, the procedure is again practically the same. In this case, however, the bracket 10 of the extension lever assembly will be located nearer the pivot 30 of the emergency brake release latch 17', and care must be taken that the roller 16 will at all times engage the latch 17'. The modified type of brake extension lever shown in Fig. 7 is also applicable to the type of emergency brake lever 14' shown in Fig. 6, and the knob 18 may obviously be disposed in different positions than those illustrated, if so desired.

The nuts 20, lock washers 21, and locking set screw 22 cooperating with the resilient sheet metal bracket 10 and clevis 12, serve to rigidly attach the extension lever assembly to the emergency brake lever handle, and avoid possibility of looseness and consequent rattling. By swingably supporting the lever member 15 upon bosses 23 formed integral with the bracket 10, a very effective pivotal connection for the member 15 is provided, and the lock washers 26, screws 27, and nuts 28 will positively prevent the member 15 from becoming disassociated with its pivots. The sheet metal formation of the bracket 10 and member 15, will, however, permit convenient assembly of these parts because of the resiliency thereof, and the roller 16 is effectively retained in position between the walls 25 by its supporting pin 29.

From the foregoing description, it will be apparent that the present invention provides a brake extension structure which may be readily attached to brake levers of various forms, and which will effectively cooperate therewith to facilitate actuation of the brake levers. The improved structure is especially applicable to brake levers of the release lever type, and is obviously readily applicable to various forms of this type of emergency brake lever. The improved structure may be readily manufactured with the aid of punches and dies, and sold at moderate cost, and presents an extremely neat and highly finished appearance when finally applied to the brake actuating lever. The improved brake extension lever has proven highly successful in actual commercial use, and is applicable to the brake actuating levers of many of the standard automobiles which are now on the market.

It should be understood that it is not desired to limit the invention to the exact details of construction and to the precise mode of manipulation herein shown and described, for various modifications within the scope of the claims may occur to persons skilled in the art.

It is claimed and desired to secure by Letters Patent:—

1. An attachment for a lever having a handle and a release latch adjacent the handle, comprising, a U-shaped bracket having an end wall cooperable with the lever handle and having integral arms extending past the lever and the release latch, means disposed between said side walls and extending between the lever and the release latch for clamping said bracket in position upon the lever handle, said bracket arms having integral laterally projecting bosses, and a member swingably supported upon said bosses and cooperable with the release latch to urge the same toward the handle.

2. An attachment for a lever having a handle and a release latch adjacent the handle, comprising, a bracket adapted for attachment to the lever handle and having an end wall cooperable with the handle and integral side arms extending away from said end wall along the opposite sides of said handle and past the release latch and provided with integral circular bosses beyond the latch, a clevis between said arms and coacting with said wall to clamp the same to the lever handle, and a member swingably supported upon said bosses and having a roller cooperable with the release latch to urge the same toward the handle.

3. An attachment for a lever having a handle and a release latch adjacent the handle, comprising, a U-shaped bracket adapted for disposition against one side of the lever handle and having arms extending rearwardly past the handle and the release latch and provided with integral alined circular bosses, a clevis disposed within said bracket between said arms and coacting with the opposite side of the lever handle between the latter and the latch, means coacting with said bracket and with said clevis for clamping these elements against the lever handle, a member swingably supported by said bracket bosses and extending rearwardly therefrom and away from the lever, a roller carried by said member and coacting with the release latch to urge the same toward the handle, and manipulating means carried by the rear extremity of said member.

4. An attachment for a lever having a handle and a release latch adjacent the handle, comprising, a sheet metal bracket coacting with one side of the lever handle and having arms extending rearwardly beyond the opposite sides of the handle and of the release latch and having outwardly extending alined bosses, a clevis confined within said bracket between said arms and coacting with the opposite side of the lever handle adjacent the latch, means for clamping said bracket and clevis against the lever handle, a locking set screw carried by said bracket and cooperable with the lever handle, and a member swingably supported by said bracket bosses beyond the release latch and having means cooperable with the latter to urge the same toward the handle.

5. An attachment for a lever having a handle and a release latch adjacent the handle, comprising, a sheet metal bracket adapted for coaction with the lever handle and having integral side arms extending rearwardly past the opposite sides of the handle and beyond the release latch, a clevis concealed between said arms for attaching said bracket to the lever handle, said bracket side arms having integral circular bosses at the rear extremities thereof, a member swingably supported by said bosses, means for maintaining said member in position upon said bosses, and anti-friction means carried by said member and cooperable with the release latch to urge the same toward the handle.

6. An attachment for a lever having a handle and a release latch adjacent the handle, comprising, a sheet metal bracket having an end wall provided with vertically spaced flanges cooperable with the lever handle, a clevis disposed within said bracket between said flanges for clamping the bracket to the lever handle, and a member swingably supported by said bracket and cooperable with the release latch to urge the same toward the handle.

7. An attachment for a lever having a handle and a release latch adjacent the handle, comprising, a sheet metal bracket having an end wall provided with integral flanges cooperable with the lever handle and having side arms extending rearwardly beyond the handle and the release latch and provided with integral circular bosses, a clevis disposed within said bracket between said arms for clamping said flanges against the lever handle, a member pivotally supported upon said bosses, and a roller carried by said member remote from said bosses, said roller being cooperable with the release latch to urge the same toward the handle.

8. An attachment for a lever having a handle and a release latch adjacent the handle, comprising, a sheet metal bracket having an end wall provided with integral flanges cooperable with the lever handle and having side arms extending rearwardly past the handle and beyond the release latch and provided with integral circular bosses, a clevis concealed within said bracket for clamping said flanges against the lever handle, a sheet metal member having its upper forward end pivotally associated with said bosses and having side walls disposed outwardly beyond said bracket arms, a roller supported between the lower portions of said side walls and cooperable with the release latch to urge the same toward the lever handle, and manipulating means associated with the rear extremity of said member.

JOEL R. THORP.
STEEN STRAND.